Dec. 30, 1958  J. M. ALESSI  2,866,451
BAKING PAN FOR CHEESE CAKES
Filed June 26, 1953

INVENTOR
John m. Alessi
BY Shoemaker & Mattare
ATTORNEYS

United States Patent Office 2,866,451
Patented Dec. 30, 1958

2,866,451

BAKING PAN FOR CHEESE CAKES

John M. Alessi, Tampa, Fla.

Application June 26, 1953, Serial No. 364,337

2 Claims. (Cl. 126—385)

This invention relates to a baking pan in which cheese cake, or the like, may be baked.

Cheese cake is baked in pans having a flat bottom and upstanding walls along its margins. When making a cheese cake the pan is filled to a predetermined depth with dough and the pan placed in an oven. During the baking operation the dough first rises and then settles and when baking is completed a cake is produced which is of substantially a predetermined thickness and preferably slightly thicker than the depth of the dough poured in the pan.

It has been found that when a conventional cheese cake pan is used, the initial rising will cause the dough to expand upwardly to such an extent that it is liable to flow over upper edges of the walls of the pan and thus form a curled and crusty edge portion along margins of the finished cake. This is objectionable as the edge portions of the cake are liable to be broken off when the cake is removed from the pan, and it is, therefore, one object of the invention to provide a device which constitutes an attachment for a cheese cake pan and may be removably applied to the pan and serve as an extension in which dough may expand as it rises and then sink to a reduced thickness without overflowing and running down walls of the pan.

Often the finished cake will be dry and stick to the roof of a person's mouth, which many persons object to, and it is, therefore, another object of the invention to provide an attachment for a baking pan which includes an outstanding portion forming a trough in which water is placed so that during a baking operation vapor given off by the water may form moist air in an oven and thus cause the cake to be soft and of an even moist texture throughout the entire cake and thus be more palatable to persons who object to a cheese cake which is too dry and has cracks in its upper surface.

Another object of the invention is to so form the device that when it is applied to a baking pan it will extend into the pan the full depth thereof and its outstanding trough extend across upper edges of walls of the pan, the attachment being thus firmly supported and prevented from tilting out of its proper position upon the pan.

Another object of the invention is to so form the attachment that while it will be firmly held in engagement with the pan, it may be very easily applied to or removed from the pan.

Another object of the invention is to provide a device of this character which is formed entirely of sheet metal and is of simple construction, very efficient in operation, and may be easily removed and thoroughly cleaned after use.

With these and other objects in view, the baking pan attachment is of an improved construction, a practical embodiment of the invention being illustrated in the accompanying drawings wherein.

Figure 1:
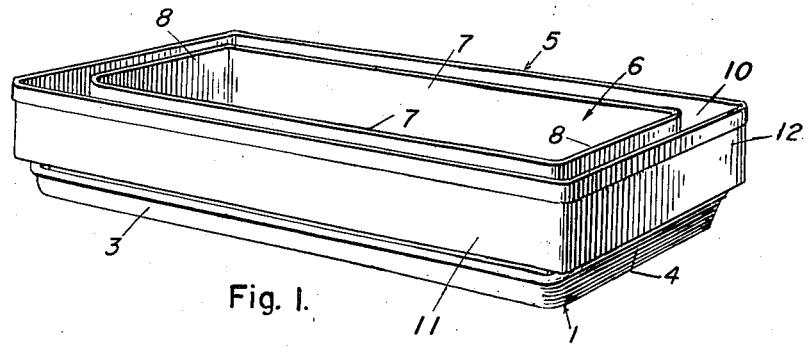
Fig. 1 is a perspective view showing a baking pan and an attachment of the improved construction applied thereto.
Figure 2:
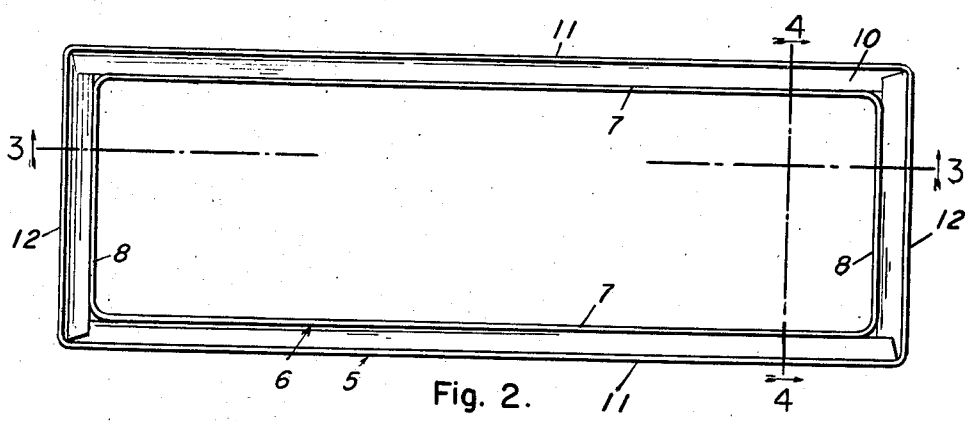
Fig. 2 is a top plan view of the attachment.

The pan 1 may be formed of any suitable stiff metal and has a bottom 2, side walls 3 and end walls 4. This pan may be of any length and width desired and in the illustration is of the proper dimensions for baking a single cheese cake. It will also be understood that while the pan has been shown oblong, it may be square, circular or any other desired shape.

When a cheese cake pan of conventional form is used and a cake baked therein, batter or dough is poured into the pan and during a baking operation, the dough or batter first rises and expands upwardly and then settles during final stages of the baking. A cake so baked has been found to be dry and its upper crust is also often formed with cracks. Since the cheese cake is dry, many persons object to its taste and also it has been found, due to its dryness, such a cheese cake will often have a tendency to stick to the top of the mouth when it is eaten.

In order to overcome these objections the improved cheese cake pan includes an attachment 5 in the form of a barrier structure which is also formed of stiff metal and has a body portion or wall structure 6 which is a great deal deeper than the pan 1 and is open at its top and bottom and has side walls 7 and end walls 8. The body or wall of the barrier structure 5 is of such length and width that it fits snugly within the pan 1 with lower edges of its walls resting upon the bottom 2 of the pan. The wall ends of the corners where the side and end walls joins are cut away to form recesses 9 which open through the bottom edges of the walls of the body so that when the attachment is inserted into the pan and the body thrust downwardly into the pan, the portions of the side walls and of the end walls will yield or be flexed inwardly somewhat as they move downwardly against the sloping pan walls and thus have close fitting engagement with the walls of the pan along side edges and end edges of the bottom 2 thereof.

This body or barrier wall structure is a great deal deeper than the depth of the pan 1 and when the attachment is applied to the pan, walls of the barrier body project upwardly quite a distance above walls of the pan. Due to the depth of the body or wall structure dough or batter may be poured into the pan through the open top of the body until the body is filled to approximately an inch below the upper edges of walls of the body, and in Fig. 3 the dotted line A—A indicates the depth of the dough or batter which is poured into the pan. When the pan is placed in an oven of the proper temperature, the dough or batter first rises and expands upwardly so that it protrudes somewhat from the top of the body as indicated by the dotted line B—B in Fig. 3 and as the baking continues the partially baked cake will settle to the depth indicated by the dotted line C—C, this being the depth of the finished cake. A cake will thus be made which is quite thick and is preferably slightly thicker than the original depth of the dough or batter poured into the pan.

In order to prevent the dough or batter from drying too much during the baking operation, it is desired to supply moisture to air in the oven in which the cake is being baked. In order to do so, it has been provided with a trough 10 which is also formed of sheet metal. This trough extends entirely about the body or wall structure and has side walls 11 and end walls 12 which are parallel to and spaced outwardly from the walls of the body with their upper edges substantially level with the upper edges of the walls of the body. While it has been stated that the upper edges of the walls of the trough are substantially level with the walls of the body, it will be noted from an inspection of Figs. 3 and 4 that they are spaced downwardly a short distance below the edges of the walls of the body. The bottom 13 extends inwardly from the walls of the trough and along their inner marginal edge portions is formed with depending flanges 14 which may be soldered or welded to outer surfaces of the walls of the body. These flanges are so secured to the walls of the body that they are slightly above the walls of the pan when the body is thrust downwardly into the pan and, therefore, do not interfere with proper seating of the body in the pan when the attachment is applied to the pan.

Figure 3:
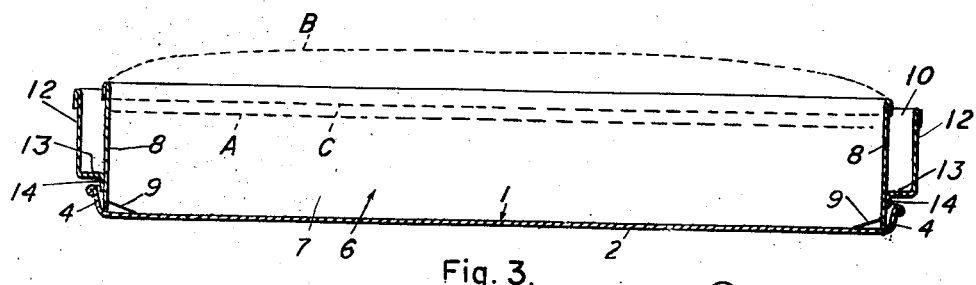
Fig. 3 is a sectional view taken longitudinally through the pan and the attachment along the line 3—3 of Fig. 2.
Figure 4:
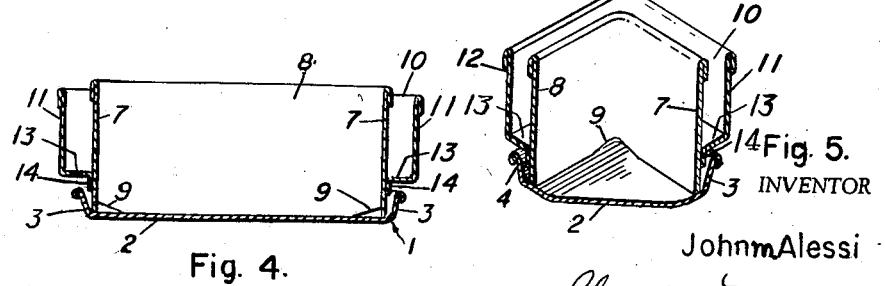
Fig. 4 is a sectional view taken transversely through the pan and the attachment along the line 4—4 of Fig. 2.
Figure 5:
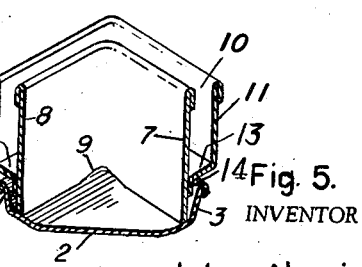
Fig. 5 is a perspective view of one corner portion of the pan and the attachment.

When a pan so formed is in use, the attachment is applied to the pan as shown, with the lower edges of the walls of the body bearing against the bottom of the pan and dough or batter is poured into the pan through the open top of the body until the upper surface of the dough or batter is approximately at the line A—A in Fig. 3. Water may be poured into the trough either before or after the dough or batter has been poured into the pan and will be of such depth that some of the water will remain in the trough when the baking operation is completed. The filled pan is placed in an oven of the proper temperature and during the baking operation the dough or batter expands upwardly until it protrudes somewhat above the open top of the body, as indicated by the line B—B, and then settles to such an extent that the top of the cake reaches the line C—C which is slightly above the line A—A.

Water in the trough is heated during the baking operation and gives off vapors which moisten the air in the oven and since the body is entirely open at its top, this moist air will have contact with the baking cake and cause the finished cake to be of an even, moist consistency and also prevent formation of a dry crust. Therefore, when the cake is removed from the pan it will be of a moist texture throughout and will not have a dry and cracked upper crust.

After the cake has been baked and removed from the oven, a knife or spatula is thrust downwardly and moved along inner surfaces of the walls 7 and 8 of the body so as to loosen the cake from the body and the attachment may then be drawn upwardly and leave the cake resting upon the pan.

It will be understood that when the cake is sold, it may be cut into pieces of the proper size which are individually removed from the pan, or the entire cake may be removed from the pan.

If it is desired to bake two or more cakes at one time, a pan is used which is of such dimensions that two or more of the attachments may be seated in the pan in side by side relation to each other. There has, therefore, been provided an attachment which may be very easily and quickly applied to a pan and may be also very readily removed after the cake has been baked.

Since the attachment is readily removable from the pan, all portions of the pan and the attachment may be thoroughly cleaned and thus provide a sanitary device.

If so desired, a number of partitions may be mounted in the body transversely thereof and secured at their end to inner surfaces of its side walls and thus allow a number of cheese cakes of a size customarily brought by customers to be baked and individually removed from the pan for sale after the attachment has been withdrawn from the pan.

I claim:

1. As an article of manufacture for attachment to a conventional shallow baking pan; a rectangular frame-like unit comprising vertical side and end walls, a trough on the outside of and encircling said walls and having a narrow bottom and outer side and end walls, said trough bottom being joined to the first named side and end walls adjacent to the bottom edges of the latter and said trough outer side and end walls being of a height approximately equal to but not greater than the height of the first named side and end walls, and said first named side and end walls being cut away across the bottom ends of the corners therebetween to form bottom corner recesses whereby the material of the walls between the recesses may be inwardly flexed.

2. In a culinary receptacle for use in baking, the combination of a conventional shallow baking pan having a bottom and low side walls and a barrier unit in and of the same contour as the pan and comprising vertical side walls of materially greater height than said pan walls and resting along their bottom edges upon the bottom of the pan along the line of joinder between said bottom and the bottom side walls, said barrier walls functioning to prevent rising cake batter overflowing the pan walls, and a trough structure on the outside of and encircling the barrier unit and having a bottom secured along an inner marginal portion to said vertical side walls and having outer walls rising from the outer margin of the trough bottom in spaced relation with the barrier walls and said trough outer walls rising through the major height of said barrier walls and terminating at their top edges in a plane not higher than the top edges of the barrier walls, the baking pan and the barrier unit being of polygonal configuration and the baking pan side walls being outwardly inclined and said barrier unit side walls having corners cut away at the bottoms forming corner recesses whereby the wall material between the recesses may flex inwardly when inserted into the baking pan and forced down against the inclined pan walls to effect a tight frictional connection between the pan walls and the unit walls.

References Cited in the file of this patent

UNITED STATES PATENTS

| | | |
|---|---|---|
| 87,390 | Betts | Mar. 2, 1869 |
| 312,478 | Lamme | Feb. 17, 1885 |
| 447,966 | Mitchell | Mar. 10, 1891 |
| 466,617 | McDaniel | Jan. 5, 1892 |
| 528,816 | Smiley | Nov. 6, 1894 |
| 771,795 | Gilmor | Oct. 4, 1904 |
| 920,973 | Meyer | May 11, 1909 |
| 1,063,144 | Wallace | May 28, 1913 |
| 1,296,423 | Neff | Mar. 4, 1919 |
| 1,362,862 | Gumula | Dec. 21, 1920 |
| 1,442,931 | Faelchle | Jan. 23, 1923 |
| 1,621,315 | D'Evlyn | Mar. 15, 1927 |
| 1,627,099 | Landgren | May 3, 1927 |
| 1,673,164 | Silen | June 12, 1928 |
| 1,687,846 | Nelson | Oct. 16, 1928 |
| 2,026,829 | Ellinger | Jan. 7, 1936 |
| 2,087,912 | Horlebeck et al. | July 27, 1937 |
| 2,177,171 | Crews | Oct. 24, 1939 |
| 2,621,616 | Ames | Dec. 16, 1952 |
| 2,644,444 | Cryns | July 7, 1953 |

FOREIGN PATENTS

| | | |
|---|---|---|
| 184,584 | Switzerland | Jan. 16, 1937 |